United States Patent [19]
Bricot et al.

[11] 3,971,002
[45] July 20, 1976

[54] DEVICE FOR THE OPTICAL READ-OUT OF A DIFFRACTIVE TRACK BELONGING TO A DATA CARRIER IN THE FORM OF A DISC OR TAPE

[75] Inventors: Claude Bricot; Jean Claude Lehureau, both of Paris, France

[73] Assignee: Thomson-Brandt, Paris, France

[22] Filed: June 26, 1974

[21] Appl. No.: 483,433

[30] Foreign Application Priority Data
June 29, 1973 France .......................... 73.24004

[52] U.S. Cl. .................. 340/173 LT; 179/100.3 G; 179/100.3 V; 340/173 LM
[51] Int. Cl.² ................. G11C 7/00; G11C 13/04; G11B 21/10
[58] Field of Search ... 340/173 R, 173 LM, 173 LT; 179/100.3 G, 100.3 V; 178/6.6 R, 6.7 A; 250/202

[56] References Cited
UNITED STATES PATENTS

| | | | |
|---|---|---|---|
| 3,703,724 | 11/1972 | Thomas | 340/173 LM |
| 3,829,622 | 8/1974 | Elliot | 179/100.3 V |
| 3,876,842 | 4/1975 | Bouwhuis | 179/100.3 V |

OTHER PUBLICATIONS

Bouwhuis et al., The Optical Scanning System of the Philips 'VLP' Record Player, Philips Tech. Rev. 33, pp. 186–189, Oct. 18, 1973, No. 7.

*Primary Examiner*—Stuart N. Hecker
*Attorney, Agent, or Firm*—Cushman, Darby and Cushman

[57] ABSTRACT

The present invention relates to the optical read-out of a diffractive track carried by a data carrier. The object of the invention is an optical read-out device in which concentrated illumination of the track is effected by at least two collateral read-out spots straddling same, in order to produce a track eccentricity signal by subtraction of the voltages furnished by two groups of photo-electric transducers sensitive to the spread in the beams which form said spots.

14 Claims, 8 Drawing Figures

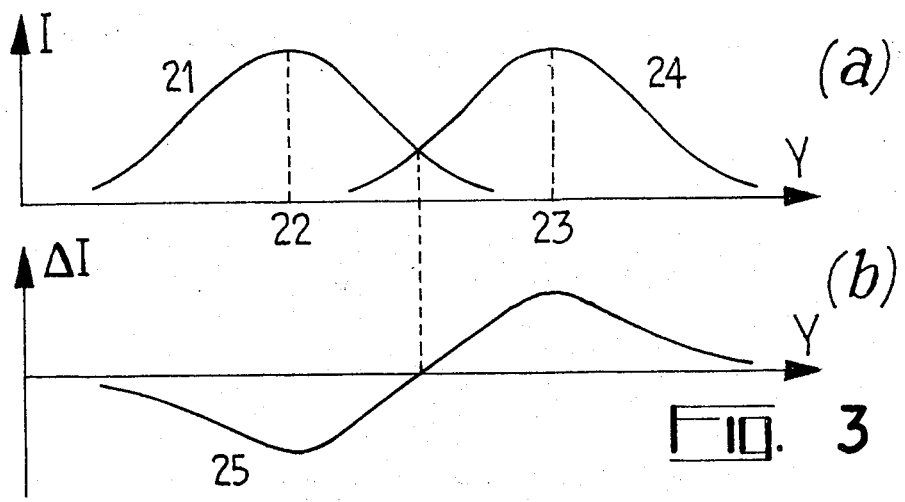
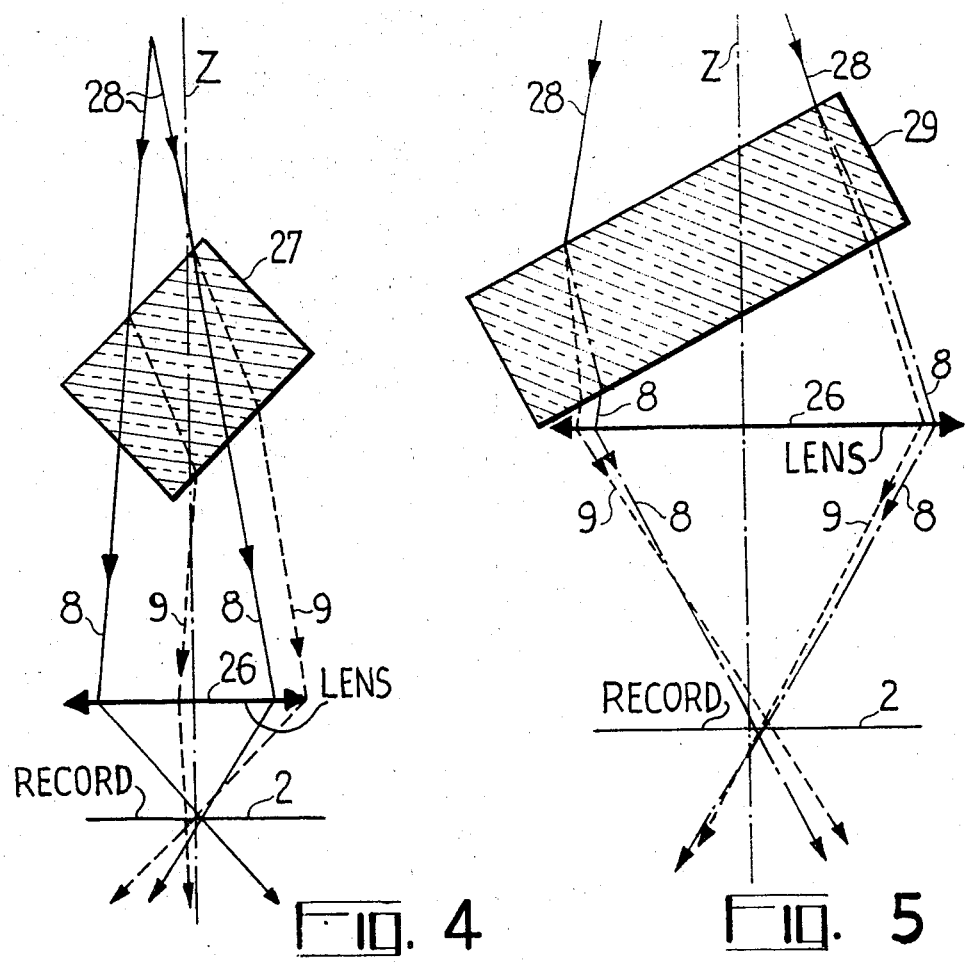

DEVICE FOR THE OPTICAL READ-OUT OF A DIFFRACTIVE TRACK BELONGING TO A DATA CARRIER IN THE FORM OF A DISC OR TAPE

The present invention relates to the optical read-out of information stored in a flexible or rigid information carrier or record, and arranged along a track comprising a succession of diffractive elements. Generally speaking, the diffractive elements constituting the track take the form of hollows or projections which can be produced by transferring an impression to a carrier which is either simply transparent or coated with a reflective layer. Although the diffractive track may be of substantially constant width, its elements have non uniform length and/or spacing, in order, along the longitudinal axis of the track, to create a square waveform angularly modulated by the information which is to be read out. In accordance with one known embodiment, the read-out of the information requires a light source associated with a projection objective lens which, at the surface of the carrier, forms a light spot of dimensions comparable with the constant width of the track. To read out the recorded information, the read-out spot must be centered on the track and since there is no kind of mechanical tracking system at all, it is necessary to have recourse to an optical sensor associated with a servo-motor which continuously corrects the position of the projection objective lens. Those skilled in the art will be aware that it is possible to simultaneously carry out read-out of the information recorded along a track and measurement of its eccentricity in relation to a read-out spot, by means of an assembly of photo-electric transducers connected to transmission circuits which, by a sum and difference procedure, furnish the read-out signal and the instantaneous value of said eccentricity. However, if a single read-out spot is being used, it turns out that the eccentricity signal tends to undergo a inadvertent change in sign and this renders the feed back positional control system unstable. This drawback is due to the lack of uniformity in the illumination received by the photo-electric transducers. This lack of uniformity is due to the interference between the light waves diffracted by the track and those responsible for producing the read-out spot. The anomalies observed are also ascribable to the fact that the track exhibits certain defects such as variation in the depth of engraving; they are due also to transfer irregularities in a situation where the read-out spot is concentrated in a plane other than the surface containing the track.

To provide an optical read-out device for reading out a diffractive track with a wider tolerance via a vis anomalies in the process of generation of the eccentricity signal, the invention provides for the read-out spot to be doubled in order to simultaneously illuminate the two edges of the diffractive track. Two illuminating beams which are decoupled from one another, are then necessary but these can be furnished by one and the same projection objective lens. The invention likewise provides for the addition of a third beam. The invention likewise provides for the addition of a third beam illuminating the track over the whole of its width in order to extract the optical information which it carries, without using the other two beams.

In accordance with the present invention there is provided an optical read-out device for the read-out of a data-carrier having a read-out surface wherein is formed a succession of diffractive elements building up a track of predetermined width, said optical read-out device including an optical read-out assembly comprising: a source of radiant energy for illuminating said read-out surface, optical projection means arranged between said source and said data-carrier for concentrating said radiant energy upon said read-out surface, and photoelectric means arranged for collecting radiant energy emerging from the portion of said read-out surface illuminated by said source; said optical projection means being capable of forming at said read-out surface at least two collateral read-out spots respectively formed by elementary beams supplied from said optical projection means; said read-out spots being aligned along an axis intersecting the longtudinal axis of said track for scanning said surface during the course of read-out over a width interval greater than said predetermined width; said photoelectric means being subdivided into at least two groups respectively sensing any spread of said elementary beams arising from the scattering action of anyone of said diffractive elements; said photoelectric means being associated with substractor means having two inputs respectively coupled to said groups.

For a better understanding of the present invention and to show how the same may be carried into effect, reference will be made to the following description and the attached figures among which:

FIG. 1 schematically illustrates a device for the optical read-out of a diffractive track, which utilizes a single spot;

FIG. 2 schematically illustrates an optical read-out device with two spots, in accordance with the invention;

FIG. 3 is an explanatory figure relating to the device shown in FIG. 2;

FIGS. 4 and 5 illustrate details of the device shown in FIG. 2;

Figure 1:
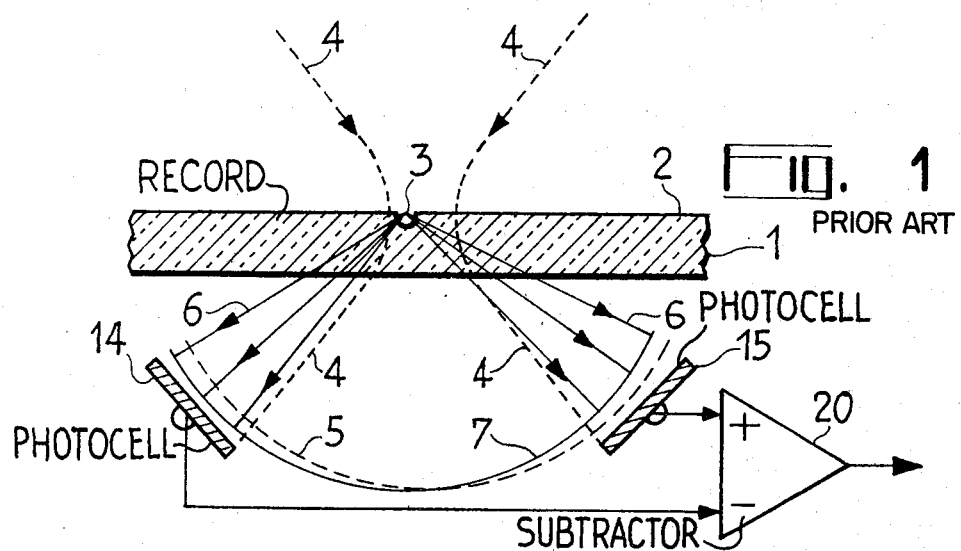

FIG. 1 schematically illustrates in a manner known per se, a device for effecting optical read-out of a diffractive track. In this figure, a transparent data carrier 1 has been shown at the surface 2 of which there has been formed a hollow impression of a diffractive track 3 whose longitudinal axis is perpendicular to the plane of the figure. The track performs a transfer motion along said axis, at constant velocity. It is made up of diffractive elements which successively encounter the concentrated beam of radiant energy delimited by the contour 4. In passing through the carrier 1, the beam projects a read-out spot and in the absence of any diffractive elements in its path, the radiant energy is contained within the interior of the dotted contour. The wavefront 5 which characterizes this non-diffracted energy, exerts a weak influence upon the two lateral photo-electric transducers 14 and 15. The subtractor 20 in this case supplies no voltage due to the equality between the detected illuminations.

When a diffractive element 3 is illuminated by the read-out spot, the radiant energy is diffracted and this causes it to spread in directions of emergence 6 which reach the sensitive faces of the photo-electric transducers 14 and 15. The wavefront 7 of the radiation fraction subjected to this spread, is centred on the diffraction element 3 and should intersect the wavefront 5 of the undiffracted portion of the radiation as soon as there is any eccentricity on the part of the element 3 in relation to the centre of the read-out spot. The result is that the interference pattern of the wavefronts 5 and 7 art the transducers 14 and 15, has a morphology which varies as a function of the eccentricity of the read-out spot vis a vis the diffractive track 3. The integration of these non-uniform illumination by the transducers, normally results in the appearance at the output of the subtractor 20 of a differential voltage which translates in terms of magnitude and sign, the eccentricity.

However, since we are concerned with interference between two wavefronts 5 and 7, the phase difference at the level of the transducers may reach a value such that the direction of variation of the eccentricity signal may locally undergo an unpredictable reversal. This operating anomaly produces instability in the positional control whose function is to maintain the read-out spot centred in relation to the diffractive track 3.

Figure 2:
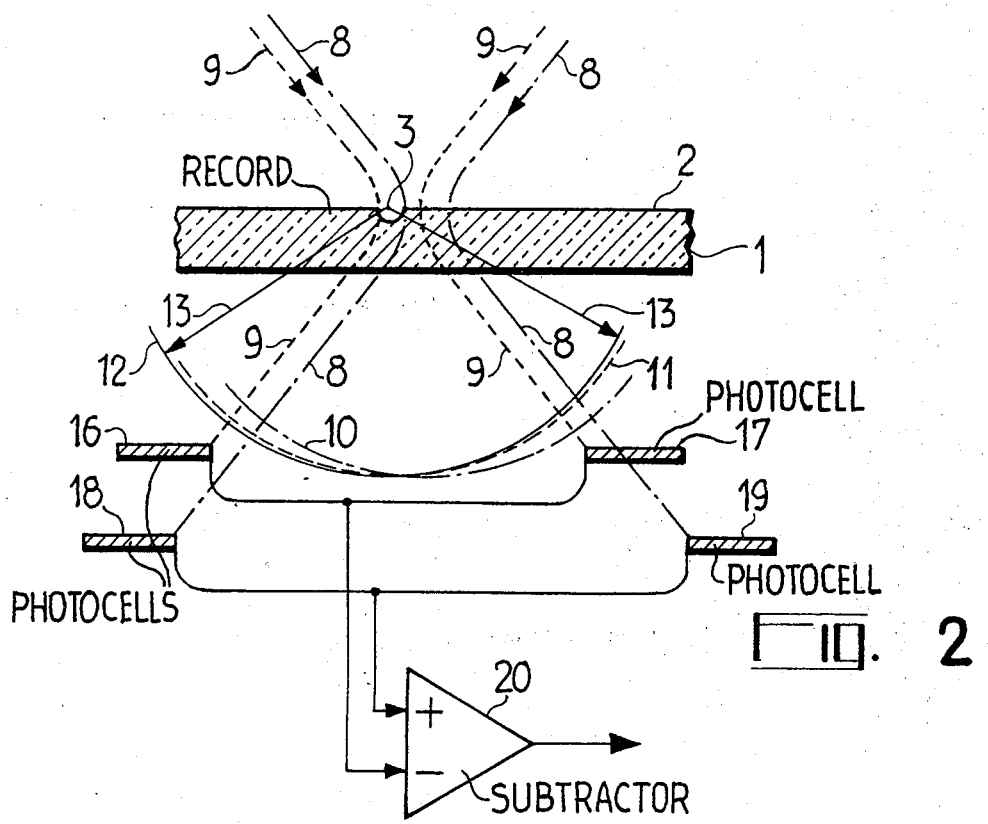

In FIG. 2, there has been schematically illustrated an optical read-out device in accordance with the invention. The device differs from the preceding one by the fact that the read-out beam 4 is doubled to give two separate elementary beams whose respective contours are indicated by the broken lines 9 and the chain dotted lines 8. At the surface 2 of the carrier 1, two offset read-out spots are obtained which touch the edges of the diffractive track 3 when the latter is centred. For convenience as far as the drawing is concerned, the dimensions of the read-out spots have been exaggerated and the photo-electric transducers 16–17 and 18–19, have been shown at different distances from the data carrier although they could equally well be located in the same detection plane.

As FIG. 2 shows, a group of photo-electric transducers 16–17 is assigned to the measurement of the disturbances introduced into the beam 9 by the diffractive element 3 plus another group of photo-electric transducers 18–19 which performs the same function in relation to the beam 8.

The eccentricity of the diffractive element 3, as shown in FIG. 2, places it beyond the read-out spot projected by the elementary beam 8. The result is that the wavefront 10 shown in chain dotted fashion and centred on this spot, has little influence upon the transducers 18 and 19. By contrast, the diffractive element 3 produces a substantial diffraction in the elementary beam 9 and this increases the illumination of the transducers 16 and 17.

It will be observed from a consideration of FIG. 2 that the waves whose wavefronts 12 and 11 are respectively centred on the element 3 and on the centre of the read-out spot projected by the beam 9, are practically coincidental with one another and this contributes to the uniformity of the illuminations picked up by the transducers 16 and 17. Under these conditions, the differential amplifier supplies an eccentricity voltage whose value depends primarily upon the voltages furnished by the transducers 16 and 17. This voltage is less affected by the anomaly referred to earlier. In a similar way, when the diffractive element 3 is located beyond the spot projected by the beam 9 and is under the influence of the other read-out spot, the voltage furnished by the amplifier 20 depends primarily upon the illumination picked up by the transducers 18 and 19. Accordingly, the translation of an eccentricity on the part of the diffractive track, into an electrical signal, is effected with a wider tolerance in terms of the possible reversal referred to earlier in respect of optical read-out devices using only one spot.

In FIG. 3, at (a) an explanatory diagram can be seen relating to FIG. 2 and illustrating, as a function of the transverse displacement Y of the diffraction track 3 vis a vis the two read-out spots, the values I of the voltages respectively applied to the inputs + and − of the amplifier 20. The graph 21 corresponds to the voltage furnished by the transducers 16 and 17; its peak 22 corresponds to the position of the track 3 in which the latter is centred vis a vis the read-out beam 9. The graph 24 relates to the voltage furnished by the transducers 18 and 19; its peak 23 corresponds to the position occupied by the track 3 when centred vis a vis the beam 8. The point of intersection between the graphs 21 and 24 indicates the intermediate position of the track 3, in respect of which the servo system need not produce any guidance correction. At (b), there has been shown the eccentricity signal 25 which is obtained at the output of the amplifier 20; this signal has a value $\Delta I$ which changes in sign when the track passes through the intermediate position. The effecitve control range extends between the maxima 22 and 23 and between these limits there is no unpredictable reversal in the direction of variation of the signal 25.

In accordance with the invention, the doubling of the read-out spot shown in FIG. 2, can be achieved using a single light source and a single projection lens.

In FIG. 4, a divergent beam of radiant energy 28 can be seen emanating from a source of radiant energy (not shown) and a projection objective lens 26 whose optical axis Z is located in the plane of the figure. That portion of the beam 28 located in front of the plane of the figure, is incident directly on the objective lens 26 and constitutes therefore the elementary beam 8 of FIG. 2, which is concentrated on the surface 2 of the data carrier 1, slightly to the right of the axis Z. That portion of the beam 28 located behind the plane of the figure passes through a refractive plate with parallel faces, 27, before reaching the objective lens 26, where it constitutes the elementary beam 9 of FIG. 2 which, in its turn, is concentrated very close to the surface 2 and slightly to the left of the axis Z. Since we know that the plane of the figure is traversed by the longitudinal axis of the diffractive track, the optical system of FIG. 4 will thus give rise to two offset read-out spots which straddle the track when it passes through the point of intersection between the surface 2 and the axis Z. By combining FIGS. 2 and 4, we obtain a complete system of two read-out spots, to which there can be added the positional control system which exploits the eccentricity signal in order for example to correct the positional deviations of the projection objective lens 26 in relation to the track.

In FIG. 5, a variant embodiment of the optical system of FIG. 4, has been shown. The system of FIG. 5, also utilizes a plate 29 with parallel faces in order to double the beam 28, but it is cut from a double-refracting material and extends both before and behind the plane of the figure. The beam 28 incident upon the plate 29 is linearly polarized in a direction such that it splits into two fractions which are differently refracted, with polarization components orientated in the same direction as the principal axes of the plate 29. Thus, once again, the read-out spots are obtained at the surface 2, but the elementary beams 8 and 9 which have formed them are substantially coincidental with one another to either side of the surface 2. In order to separately detect the fractions of radiant energy contained respectively in the beams 8 and 9, it is necessary to equip the groups of transducers with suitable orientated polarization analysers.

Figure 6:
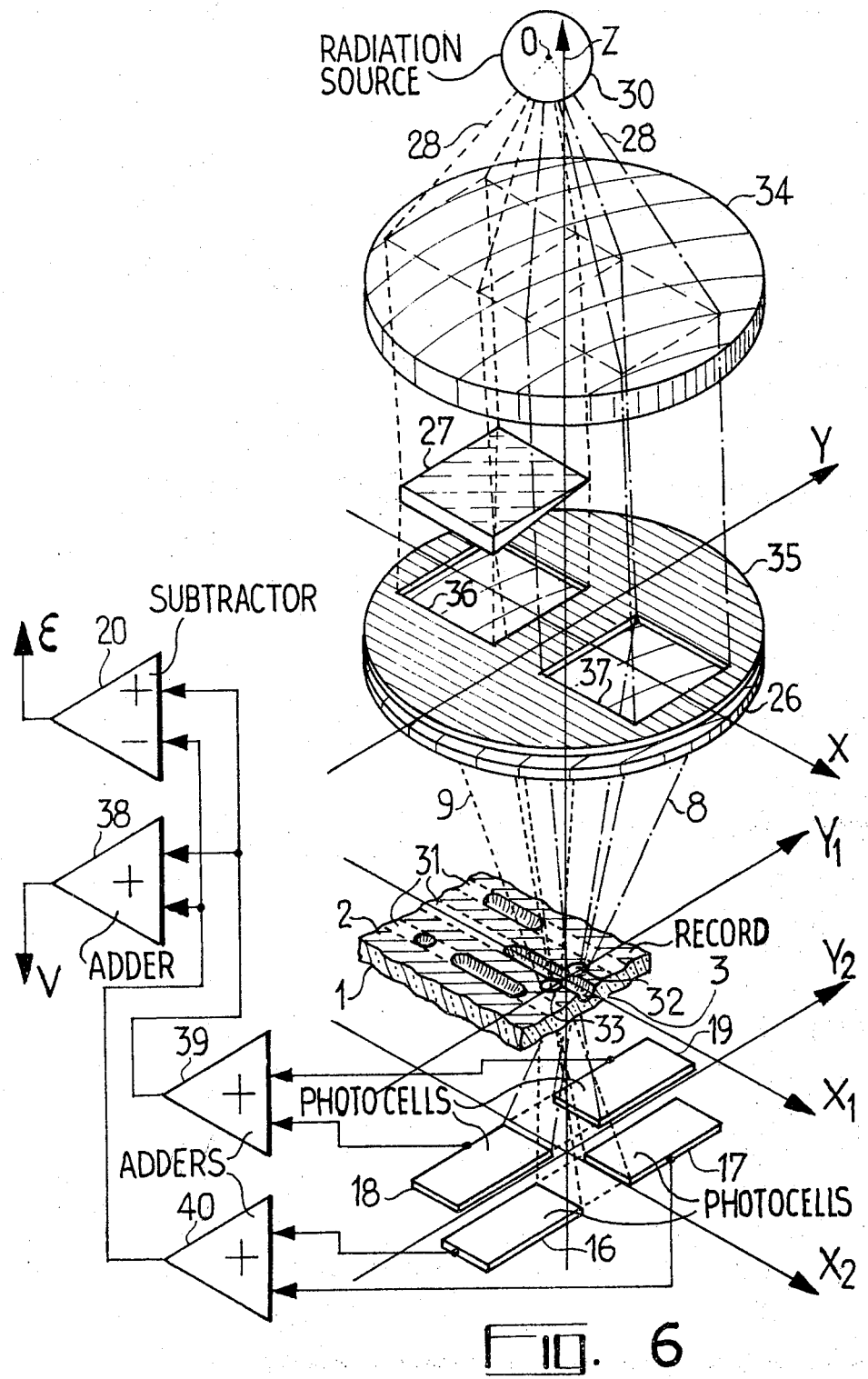
FIG. 6 is an isometric view of an embodiment of the device in accordance with the invention.

FIG. 6 is an isometric view of a read-out device in accordance with the invention, in which the doubling of the read-out beam is effected by means of a prism. The read-out radiation 28 is furnished by a source 30 whose phase centre is located slightly off the axis YZ perpendicular to the longitudinal axis $X_1$ of the diffractive track 31. A convergent lens 34 whose focus is on the axis Z at the height of the point 0, converts the incident radiation into a parallel beam which is slightly obliquely directed in relation to the axis Z. A mask 35 with two windows 36 and 37 is arranged in the neighbourhood of the projection objective lens 26, in order, from the plane XY, to delimit two square-section light beams which, due to the presence of the prism 27, have equal obliquities and opposite signs in relation to the optical axis Z of the objective lens 26. The surface 2 of the data carrier 1 which is located in the focal plane $X_1Y_1$ of the objective lens 26, receives from the windows 36 and 37 light beams 9 and 8 which are concentrated in order to respectively form the read-out spots 33 and 32. The spots 33 and 32 are aligned in the direction $Y_1$ and normally straddle the axis $X_1$ of the diffractive track 31. The light beams 8 and 9 pass through the carrier 1 and, in the detection plane $X_2Y_2$, illuminate square zones respectively covered by the photoelectric transducers 18–19 and 16–17. The two photoelectric transducers are under the influence of the beam 9 and the read-out spot 33; they have their outputs connected to an adder circuit 40. The two photo-electric transducers 18 and 19 are under the influence of the beam 8 and the read-out spot 32; they are also connected to an adder circuit 39. The adder circuits 39 and 40 respectively supply the inputs of a further adder circuit 38 which furnishes the voltage V, and those of a subtractor circuit 20 which furnishes the eccentricity signal $\epsilon$. There is nothing to prevent each group of transducers from comprising just a single element, directly connected to the inputs of the circuits 20 and 38. In this case, however, it is necessary to mask off the central zone of each group or to quite simply discard one of the transducers of the two composing each group. In FIG. 6, it can be seen that the track 31 can be split into several equidistant portions separated by cross hatched, completely smooth zones of the surface 2 of the carrier 1. This case occurs in particular if the carrier 1 is a disc on which the track 31 has been recorded in the form of a spiral; the successive turns of the spiral have their radii struck from the axis $Y_1$ defining the centre of the rotation of the disc.

The interval between the two read-out spots in the read-out plane $X_1Y_1$ is adjusted so that they they overlap onto the track portion passing between them in the direction $X_1$. However, the interval must not have such a value that the spots can overlap onto adjacent tracks. The operation of the device shown in FIG. 6 as far as the formation of the eccentricity signal $\epsilon$ is concerned, has already been described. This signal is substantially zero when the two spots symmetrically straddle the diffractive element 3 of the portion of the track 31 being read out. It acquires a positive or negative value depending upon whether the diffractive element moves off center in or the other sense, in the direction $Y_1$ of the read-out plane. It is not necessary for the line joining the centres of the two spots to be perpendicular to the longitudinal axis $X_1$ of the track in order for the eccentricity signal to be properly produced, since all that is necessary is that the spots should not be aligned on the diffractive track 31. The advantage of choosing a transverse orientation of the light spots, resides in the possibility which thus affords to effect fine read-out of the stored information. In other words, from the point of view of information read-out, the two spots are equivalent to one read-out spot of elongated shape, whose narrowest dimension is in the direction of transfer of the track. If the surface 2 is illuminated in a smooth zone, the radiation being undiffracted, the volatge V is higher because none of the transducers is illuminated. When the illumination of the surface 2 involves a diffractive element, the diffraction which results spreads the radiation transmitted towards the detection plane and the voltage V acquires a higher value. The increase in the voltage V takes place when the diffractive element 3 reaches the zone illuminated by the objective lens 26, and is maintained until the element quits this zone.

Figure 7:
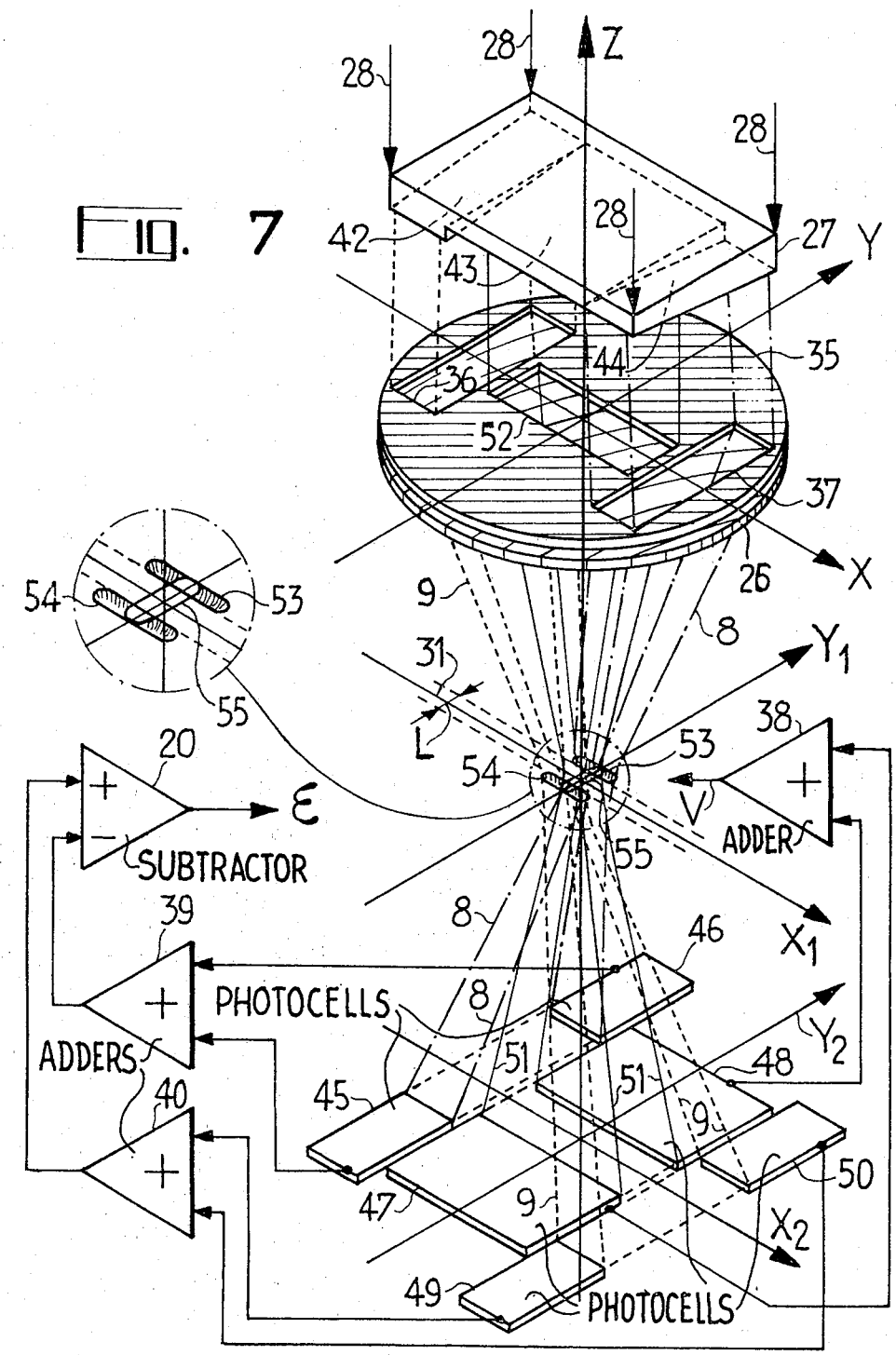
FIG. 7 is an isometric view of a first variant embodiment of the device in accordance with the invention.

In FIG. 7, an isometric view can be seen, of a variant embodiment of the device shown in FIG. 6.

In this version, to read out a diffractive track 31 of width L, an assembly of three spots is used; one of them is assigned to the read-out of the information and the other two serve to produce the eccentricity signal 2. As in FIG. 6, the spots 53 and 54 are projected to either side of the diffractive track 31 in order to partially overlap onto same. Preferentially, they will be given an elongated shape in the direction of transfer since their function is simply to detect transverse movements of the track 31. The spot 55 designed to read out the information carried by the track is projected in such a way as to completely cover the track 31 and, preferentially, this spot will have an elongated shape which overlaps the track portion being read out without, ever, reaching the neighbouring track portions; the narrow shape of the spot 55 makes it possible to effect fine information read-out. Grouping these various forms, the illuminated zone of the read-out plane resembles the letter H with its legs disposed parallel to the longitudinal axis $X_1$ of the track 31.

FIG. 7 shows how this configuration of spots can be produced. The read-out beam 28, after having been rendered parallel, is incident upon a refractive plate 27 which, in the central zone 43, has parallel faces and in the marginal zones 42 and 44 non-parallel faces designed to locally change the orientation of the parallel light rays; the centre beam is codirectional with the axis Z and the two others are slightly oblique in attitude, in mutually opposite directions. The beams are delimited by three rectangular windows 36, 37 and 52 formed in the mask 35 which is arranged in the neighbourhood of the projection objective lens 26. Since the projection of the spots 54, 53 and 55 takes place in the focal plate X, Y, of the objective lens 26, and in view of the diffraction phenomena occuring in the neighbourhood of the focus of an objective lens, it will be seen that it is necessary for the major axis of the window 36 to be parallel to the axis $Y_1$ so that the radiation emerging from it can produce the elongaged spot 54 whose major axis is parallel to the axis $X_1$; the same applies to the orientation of the two other rectangular windows 52 and 37, the emergent radiations from which form the elongated spots 55 and 53.

Considering projection onto the detection plane $X_2Y_2$, of radiation giving rise to the spots 53, 54 and 55, it will be seen that in the absence of any diffractive element in the path of the three read-out beams 8, 9 and 51, the radiant energy is projected onto the detection plane $X_2Y_2$ at three zones which are the pseudo images of the windows located in the XY plane. The zone illuminated by the beam 8 is straddled by the photo-electric transducers 45 and 46 in order to pick up the spread radiation due to coincidence between a diffractive element of the track 31, and the spot 53. The photo-electric transducers 49 and 50 perform the same function vis a vis the beam 9 and the spot 54. By combining the voltages produced by the transducers 45, 46, 49 and 50, with the help of circuits 39, 40 and 20, the eccentricity signal which is required to guide the read-out device is obtained. The photo-electric transducers 47 and 48 which straddle the zone illuminated by the read-out beam 51, are designed to read out the information stored in the diffractive track 31; to this end, they are connected to an adder circuit 38 which produces a square waveform V characteristic of the distribution of the diffractive elements along the track 31. It is not necessary to provide two transducers for each read-out beam, instead it is equally possible to utilize in each group a single transducer whose central portion has been masked off in order to render the latter insensitive to the undiffracted radiation fraction.

Figure 8:
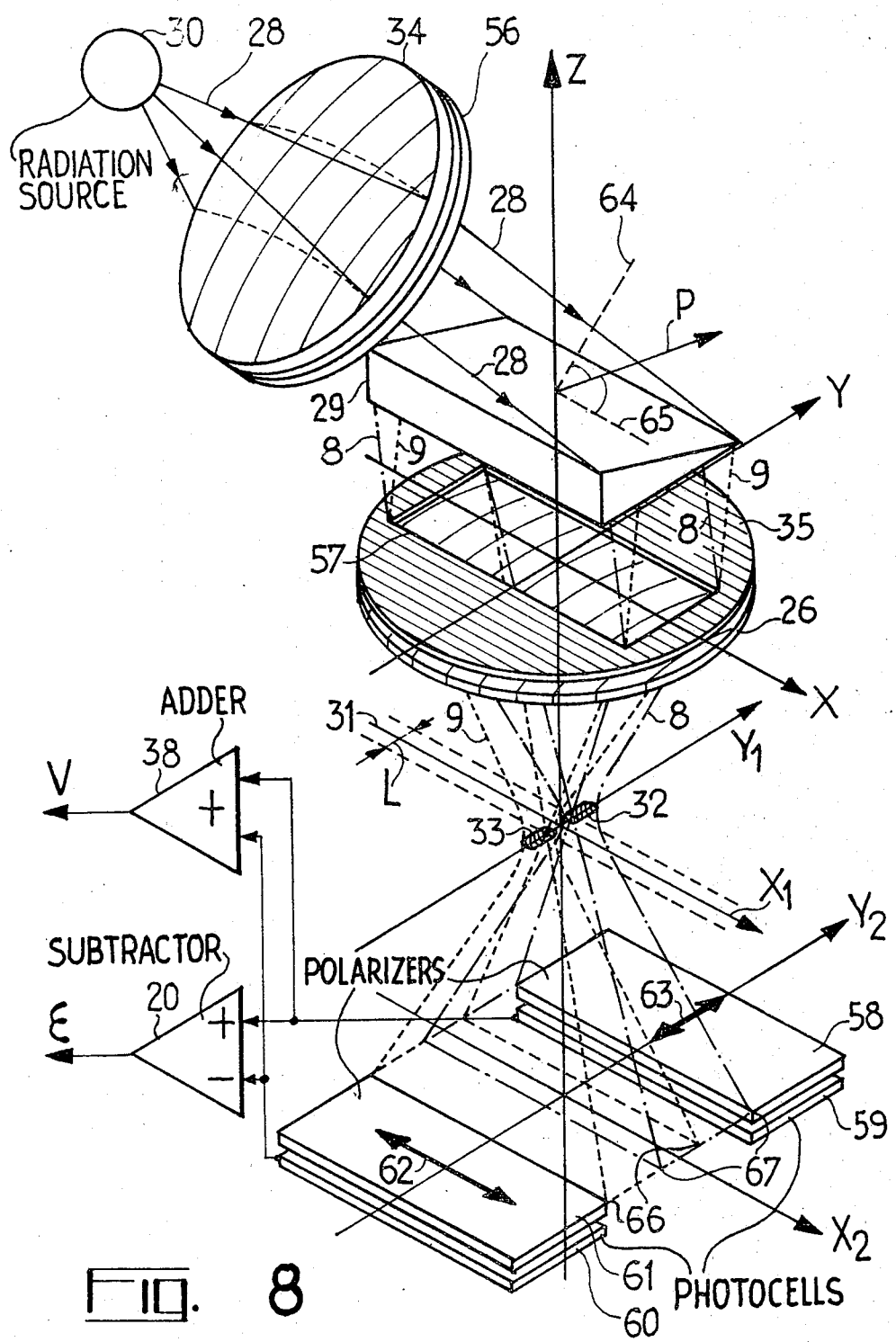
FIG. 8 is an isometric view of a second variant embodiment of the device in accordance with the invention.

In FIG. 8, another embodiment of the read-out device in accordance with the invention can be seen. It is distinguished from the other embodiments already described, by its use of a double-refracting prism 29. The radiation source 30 and the optical system formed by the lens 34 and the polarizer 56, make it possible to project onto the prism 29 a parallel read-out radiation 28 whose polarization P is disposed obliquely in relation to the two principal axes 64 and 65 of the material from which the prism 29 is cut. The exit face of the prism 29 supplies two oblique radiation fractions 8 and 9 which pass through the window 57 in the mask 35 and are then concentrated by the projection of objective lens 26 in the read-out plane $X_1Y_1$ which contains the diffractive track 31 of width L. Because of the double-refracting property of the prism 29, two read-out spots, 32 and 33, are obtained in the read-out plane $X_1Y_1$ and since the window 57 has its major axis arranged in the direction X, these two elongated spots have their major dimension in the direction $Y_1$, intersecting the longitudinal axis of the track 31. The spots 32 and 33 straddle the track 31 and can therefor be used both to read out the track and to measure its eccentricity. After having projected the two spots 32 and 33 onto the read-out planes, the beams 8 and 9, respectively illuminate, in the detection plane $X_2Y_2$, the rectangular zones 67 and 68 which overlap substantially more than FIG. 8 would suggest where the distance between the spots 32 and 33 has been much exaggerated. Outside these illuminated zones 66 and 67, which are the only ones to receive light in the absence of any diffractive elements in the path of the beams 8 and 9, two photo-electric transducers 60 and 59 are arranged. These receive the diffracted radiation fractions occurring in the presence of a diffractive element, and since these fractions have crossed polarizations the transducers 60 and 59 are associated with polarization analysers 61 and 58. The transducers 60 is sensitive only to spread in the beam 9 whose polarization direction 62 is determined by the double-refracting prism 29, whilst the transducer 59 is sensitive only to spread in the beam 8 whose polarization direction 63 is perpendicular to the direction 62. Thus, due to the polarization analysers 58 and 61, it is possible to provide two groups of transducers which are respectively sensitive to the diffractions occuring in the read-out beams 8 and 9. This comes back to the same kind of processing of the signals furnished by the transducers 59 and 60, as far as the formation of the eccentricity signal $\epsilon$ and the read-out signal proper, V, is concerned. It should be pointed out that the space between the transducers 60 and 59 may contain a photo-electric transducer designed to directly furnish the read-out signal V, because the spread in a read-out radiation under the effect of a diffractive element, brings about a reduction in luminous intensity in the zone which is illuminated in the absence of any diffractive element.

What we claim is:

1. An optical read-out device for the read-out of a data-carrier having a read-out surface wherein is formed a succession of diffractive elements building up a track of predetermined width, said optical read-out device including an optical read-out assembly comprising: a source of radiant energy for illuminating said read-out surface, optical projection means arranged between said source and said data-carrier for concentrating said radiant energy upon said read-out surface, and photoelectric means arranged for collecting radiant energy emerging from the portion of said read-out surface illuminated by said source; said optical projection means forming at said read-out surface two collateral read-out spots respectively formed by elementary beams supplied from said optical projection means; said read-out spots being aligned along an axis intersecting the longitudinal axis of said track for scanning said surface during the course of read-out over a width interval greater than said predetermined width; said photoelectric means being subdivided into at least two groups respectively sensing any spread of said elementary beams arising from the scattering action of anyone of said diffractive elements; said photoelectric means being associated with subtractor means having two inputs respectively coupled to said groups; said optical projection means comprising lens means for focussing said radiant energy upon said read out surface and refringent means with plane major faces for imparting to at least one of said elementary beams a deviation separating said read out spots from one another in said read out surface.

2. An optical read-out device as claimed in claim 1, further comprising, electrical adder means connected to said groups and supplying a read-out signal representative of the distribution of said diffractive elements along said longitudinal axis.

3. An optical read-out device as claimed in claim 1, wherein for a track made up of a set of several equidistant sections, the sum of the values of said width interval and of said predetermined width is smaller than twice the pitch of said set.

4. An optical read-out device as claimed in claim 1, wherein said optical projection means comprise: a projection lens positioned for focusing said radiant energy onto said read-out surface, polarizer means for transmitting the radiant energy emerging from said source, and optical double refracting means arranged between said polarizer means and said read-out surface; said double refracting means selectively deviating said elementary beams for separating said read-out spots from one another; each of said groups being associated with polarization analyser means selecting one of the two polarization directions of the radiant energy issuing from said optical double-refracting means.

5. An optical read-out device as claimed in claim 4, wherein said double refracting means are constituted by a plate with parallel faces.

6. An optical read-out device as claimed in claim 4, wherein said double refracting means an constituted by a prism.

7. An optical read-out device as claimed in claim 4, wherein said optical projection means further comprise a mask containing an elongated window; said mask being arranged between said source and said read-out surface.

8. An optical read-out device as claimed in claim 7, wherein the major axis of said elongated window is disposed in the direction of said longitudinal axis.

9. An optical read-out device as claimed in claim 1, wherein said optical projection means comprise: a projection lens positioned for focusing said radiant energy onto said read-out surface, an opaque mask having at least two collateral windows and arranged between said source and said read-out surface, for delimiting said elementary beams; said refringent means being arranged on at least one of the paths of said elementary beams for separating said read-out spots from one another.

10. An optical read-out device as claimed in claim 9, wherein said optical deviation means are constituted by a plate with parallel faces.

11. An optical read-out device as claimed in claim 9, wherein said optical deviation means are constituted by at least one prism.

12. An optical read-out device as claimed in claim 9, wherein said read-out surface is illuminated by a third read-out spot centred on said longitudinal axis; said photoelectric means further comprising a third group sensitive to the spread in the elementary beam forming said third read-out spot; electrical transmission means being connected to said third group, for supplying a read-out waveform representative of the distribution of said diffractive elements along said longitudinal axis.

13. An optical read-out device as claimed in claim 12, wherein said opaque mask comprises a third window located between said two collateral windows; said third window delimiting the elementary beam forming said third read-out spot.

14. An optical read-out device as claimed in claim 13, wherein said windows are of elongated form; said third window having its major axis disposed at an angle in relation to the major axes of the two other windows.

* * * * *